(12) United States Patent
Jensen et al.

(10) Patent No.: US 11,599,623 B2
(45) Date of Patent: Mar. 7, 2023

(54) GLOBAL IDENTITY FOR USE IN A HYBRID CLOUD NETWORK ARCHITECTURE

(71) Applicant: Aetna Inc., Hartford, CT (US)

(72) Inventors: Claus T. Jensen, Pawling, NY (US); Paul Kniskern, Hartford, CT (US); Joseph Arnold, Hartford, CT (US)

(73) Assignee: Aetna Inc., Hartford, CT (US)

( * ) Notice: Subject to any disclaimer, the term of this patent is extended or adjusted under 35 U.S.C. 154(b) by 279 days.

(21) Appl. No.: 16/701,501

(22) Filed: Dec. 3, 2019

(65) Prior Publication Data

US 2021/0165871 A1 Jun. 3, 2021

(51) Int. Cl.
*G06F 21/45* (2013.01)
*G06F 21/44* (2013.01)

(52) U.S. Cl.
CPC .............. *G06F 21/45* (2013.01); *G06F 21/44* (2013.01); *G06F 2221/2129* (2013.01)

(58) Field of Classification Search
CPC .. G06F 2221/2129; G06F 21/44; G06F 21/45; G06F 21/30; G06F 21/31
See application file for complete search history.

(56) References Cited

U.S. PATENT DOCUMENTS

| | | | | |
|---|---|---|---|---|
| 8,572,681 B2 * | 10/2013 | Simpson | ................ | G06Q 10/06 713/168 |
| 8,682,866 B1 * | 3/2014 | McDill | .................. | G06F 16/215 707/692 |
| 9,824,199 B2 * | 11/2017 | Kshirsagar | .......... | H04L 63/0861 |
| 2011/0197254 A1 * | 8/2011 | Sallaka | ............... | G06F 21/6218 726/1 |
| 2011/0320400 A1 * | 12/2011 | Namini | ................... | G06F 16/21 707/610 |
| 2018/0337907 A1 * | 11/2018 | Bhansali | ............... | H04L 63/102 |
| 2019/0058707 A1 * | 2/2019 | Chung | ............... | H04L 63/0807 |
| 2019/0079937 A1 * | 3/2019 | Manning | ........... | G06F 16/24578 |
| 2020/0067907 A1 * | 2/2020 | Avetisov | ............... | H04L 67/145 |
| 2020/0204527 A1 * | 6/2020 | Vass | ..................... | G06Q 20/356 |

OTHER PUBLICATIONS

Jensen, Claus T. "The Hybrid Cloud Journey," *The Hybrid Cloud Journey for Dummies, CVS Health Special Edition*, published by John Wiley & Sons, Inc. (May 7, 2019).

* cited by examiner

*Primary Examiner* — Kristine L Kincaid
*Assistant Examiner* — Lydia L Noel
(74) *Attorney, Agent, or Firm* — Leydig, Voit & Mayer, Ltd.

(57) ABSTRACT

Global identity contexts are established for unique constituents to interact with a cloud architecture through a variety of relationships. The global identity context enables a particular constituent to access services from different cloud-service providers in a secure and simplified manner. Authenticating one account can provide access to services associated with other accounts linked to the global identity context for the authenticated account. In some embodiments, the global identity platform includes an account management application and an identity management application. The account management application is configured to register one or more accounts for each constituent. The identity management application is configured to perform individualization to establish an individual identifier for each unique constituent and map each account to a particular individual identifier and one or more local identifiers.

17 Claims, 10 Drawing Sheets

GLOBAL IDENTITY FOR USE IN A HYBRID CLOUD NETWORK ARCHITECTURE

BACKGROUND

In a cloud system, different information technology (IT) systems are linked through connections across one or more networks. The networks can be public (e.g., accessible via the Internet) or private (e.g., implemented on an intranet or behind a firewall) and can be managed by more than one cloud service provider. Each service can be associated with user accounts that are mapped to local identifiers that identify a particular user within the context of that service. Where the network includes both public and private clouds, the network can be referred to as a hybrid cloud network architecture.

However, a single user may have different user accounts for different services. The user may have distinct credentials for each user account. Each user account can be associated with a local identifier that identifies the user account within the context of a specific service provider. Furthermore, the different local identifiers may not be correlated as being associated with the same unique user and, therefore, the information associated with one user account for a first cloud service provider is typically not utilized in combination with additional information associated with a different user account for a second cloud service provider.

An organization that designs a hybrid cloud for use with multiple public and private clouds managed by one or more cloud service providers might have difficulty linking different accounts to a single user. This difficulty can prevent the organization from delivering certain services that could benefit the user by combining aspects of multiple services from different cloud service providers. Customers of the organization that use the hybrid cloud may also become frustrated when their interactions with different services seem repetitive. For example, one cloud service provider may request a user to verify their account using a set of personally identifying details. When the user interacts with a different service operating within the hybrid cloud architecture, a different cloud service provider may request the user to verify their account using a different set of personally identifying details. The user may assume that the multiple services included in the hybrid cloud are related and wonder why they are being repetitively asked to verify their account multiple times.

SUMMARY

A system and method are disclosed for creating global identity contexts across different information technology systems. A global identity context can refer to a concept of matching unique constituents to one or more different accounts within the context of a cloud architecture. The global identity context is associated with a global identifier or individual identifier, which can be used throughout the cloud to identify the unique individual or entity.

In an embodiment, the system includes an account management application and an identity management application. The account management application is configured to register one or more accounts for each constituent in a plurality of constituents. The identity management application is configured to perform individualization to establish an individual identifier for each unique constituent based on one or more attributes and map each account of the one or more accounts to a particular individual identifier and one or more local identifiers. In some embodiments, the account management application is associated with an account management application programming interface (API), and the identity management application is associated with an identity management API.

In an embodiment, the plurality of constituents includes at least one consumer constituent, which comprises one of an individual associated with demographic information or an entity associated with a group of one or more individuals. In some embodiments, the demographics information includes one or more of a name of the consumer constituent, a date of birth of the consumer constituent, a gender of the consumer constituent, an identifier for the consumer constituent, an address of the consumer constituent, or a relationship of the consumer constituent with a consumer application.

In an embodiment, registering an account for a constituent includes the steps of receiving credentials to associate with the account and creating the account in an account directory. Registering the account can also include the steps of providing one or more vetting questions to a client device, receiving a vetting response provided by the constituent from the client device, transmitting a request to an identity management API to verify the vetting response, receiving a response from the identity management API that verifies the vetting response, and registering the account in an account directory as a vetted account. In some embodiments, a level of assurance for the vetted account can be increased.

In an embodiment, responsive to authentication of the client device based on the credentials, the account management application is configured to transmit a user session token associated with a corresponding account to a first consumer application. Subsequently, the identity management application is configured to receive, via an API gateway, a request for one or more local identifiers associated with the account corresponding to the user session token, authenticate information included in the session token, and transmit the one or more local identifiers to the first consumer application.

In an embodiment, the first consumer application forwards the user session token to a second consumer application in response to a connection established between the client device and the second consumer application during the duration of a user session associated with the user session token. In some embodiments, the connection between the client device and the second consumer application is initiated by the first consumer application.

In an embodiment, performing individualization includes the steps of receiving a transaction record from a system of record, processing the transaction record to generate a standard record that contains at least some attributes from the transaction record, matching the standard record to one or more keys, and generating a list of candidates by comparing the one or more keys to a plurality of golden records matching unique individuals. In some embodiments, the at least some attributes include demographic information, and performing individualization further includes the step of matching the standard record to the one or more keys by comparing the demographic information in the standard record to demographic information associated with the one or more keys. In some embodiments, performing individualization further includes the steps of generating a score for each candidate in the list of candidates based on a heuristic algorithm and removing candidates with a score below a threshold value from the list of candidates.

In an embodiment, mapping each account of the one or more accounts to the particular individual identifier and the one or more local identifiers includes the steps of retrieving, from a first table, the particular individual identifier based on an account identifier for the account, and retrieving, from a second table, the one or more local identifiers based on the particular individual identifier.

In an embodiment, each constituent is associated with one or more identities based on a relationship. The one or more identities can include a consumer identity, an employee identity, a provider identity, or a broker identity. In some embodiments, each identity of a constituent is associated with one or more accounts based on a vetting process. The one or more identities associated with the constituent comprise a global identity context for the constituent In an embodiment, a method for creating global identity contexts across different information technology systems includes the steps of registering one or more accounts for each constituent in a plurality of constituents, performing individualization to establish an individual identifier for each unique constituent based on one or more attributes, and mapping each account of the one or more accounts to a particular individual identifier and one or more local identifiers. In some embodiments, a non-transitory computer-readable medium storing instructions that, when executed by a processor, cause the processor to carry out the method.

DETAILED DESCRIPTION

A global identifier associated with a global identity context is defined to identify unique individuals within the context of a cloud architecture. The global identity context matches multiple different accounts to a unique constituent corresponding to that global identity context and can be used to establish a link between different IT systems throughout the cloud.

For example, one service provider can establish an account for a person and assign that account a local identifier. A second service provider can also establish an account for the person and assign that account a different local identifier. Because the local identifiers are only understood within the context of services provided by the corresponding service providers, information related to the individual in one service cannot be linked to information related to the individual in the context of another service associated with a different service provider.

In order to provide a better consumer experience within the hybrid cloud, a global identity context can be established for unique individuals and then a global identifier assigned to the individual can be mapped to the local identifiers utilized within the context of the individual service providers.

Figure 1A:
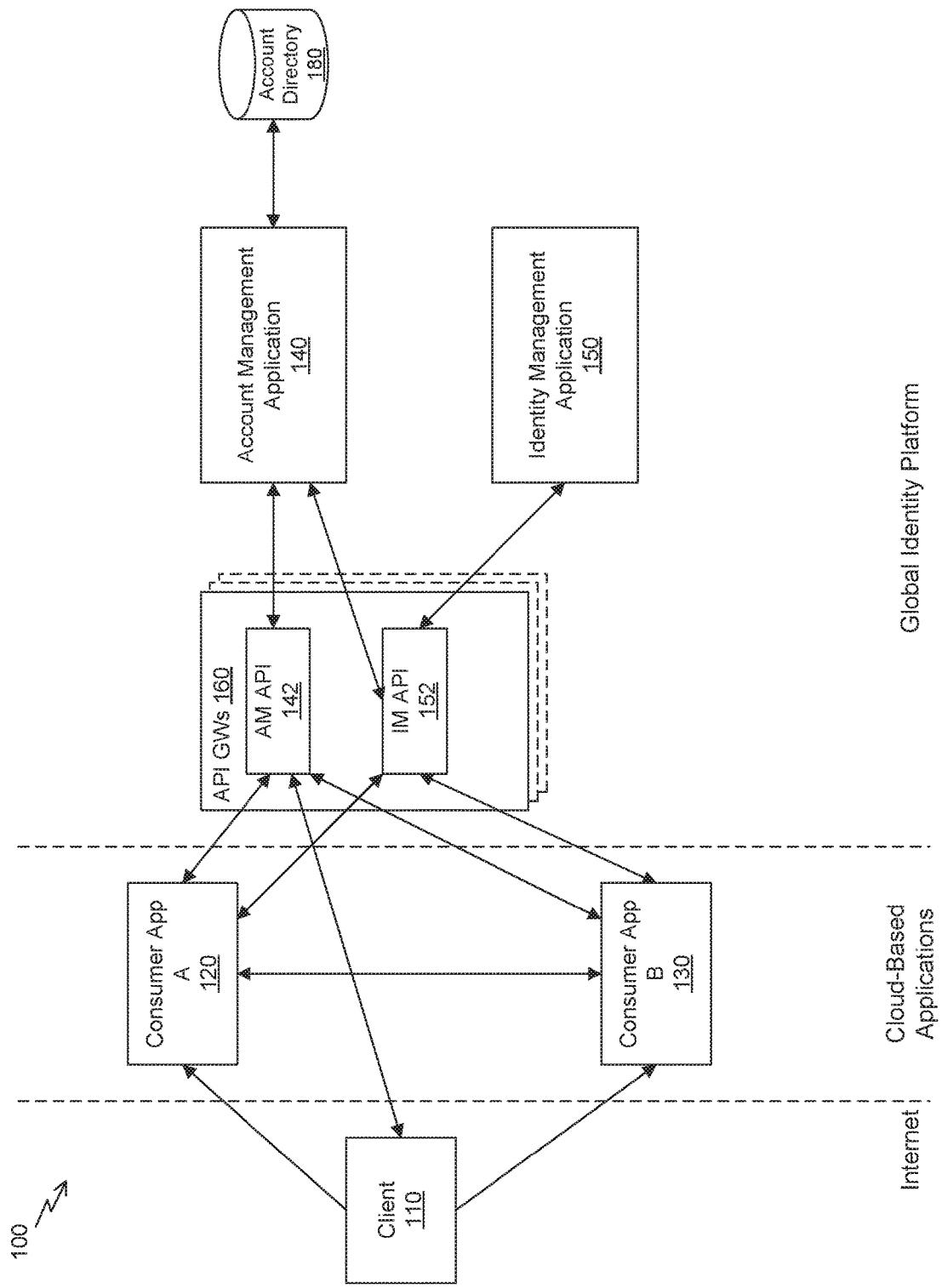
FIG. 1A illustrates a global identity platform that is included as a component of a hybrid cloud network architecture, in accordance with some embodiments.

FIG. 1A illustrates a global identity platform that is included as a component of a cloud network architecture, in accordance with some embodiments. As depicted in FIG. 1A, the network 100 includes a global identity platform that includes an account management application (AM App) 140, an identity management application (IM App) 150, and a number of Application Programming Interface (API) gateways 160. The AM App 140 is associated with an AM API 142, and the IM App 150 is associated with an IM API 152. In some embodiments, the AM App 140 can be implemented on a separate network resource as the AM API 142, and the IM App 150 can be implemented on a separate network resource as the IM API 152. More particularly, in some embodiments, the AM API 142 and the IM API 152 can be deployed on an API gateway 160 while the AM App 140 and the IM App 150 are implemented on one or more server devices in a data center associated with the API gateway 160.

In some embodiments, the AM App 140 is configured to only respond to connections from the AM API 142, and the IM App 150 is configured to only respond to connections from the IM API 152. Thus, a level of security is established that prohibits external connections from the Internet or even other devices within the same local area network (LAN) from accessing the AM App 140 or the IM App 150, directly.

In an embodiment, the global identity platform is configured to create and manage global identity contexts associated with unique constituents. The global identity context refers to a concept that a user establishes different accounts within the hybrid cloud ecosystem and that those accounts can all be linked as being associated with the same user. Each time the user creates an account with a particular cloud service provider, that account can be linked to the user's global identity context. The global identity context is mapped to a global identifier. In an embodiment, the global identifier is a universally unique identifier (UUID) that has a one-to-one correspondence with a constituent. In other embodiments, the global identifier is any data structure or data type that can uniquely identify an individual or entity, such as a 32-bit or 64-bit unsigned integer. In some embodiments, the global identifier can be referred to, generally, as an individual identifier and/or a constituent identifier.

In some embodiments, the AM App 140 is connected to an account directory 180, which stores information related to a plurality of user accounts. When a user creates an account through a consumer application 120, 130, the registration process can be performed, at least in part, by the AM App 140. A new entry can be created in the account directory 180 that maps a local identifier to the user account. The account directory 180 can also store credentials for the user account.

In an embodiment, the AM API 142 and the IM API 152, through and in connection with other processes implemented within the API gateways 160, ensure that trusted consumer applications 120, 130 interact with authenticated client devices 110. Although only one client device 110 is shown in FIG. 1A, it will be appreciated that a large number of client devices 110 can be connected to the consumer applications 120, 130 during any particular period of time.

In an embodiment, the network 100 is a wide area network (WAN) such as the Internet. Portions of the network 100 can be implemented as local area networks (LANs) implemented across one or more regions. The network 100 can include one or more data centers comprising processing and storage resources. In some embodiments, a data center can include a number of network nodes. The data center can be implemented using racks of server devices (e.g., blade servers) included in a chassis, and each server device may be associated with storage resources such as hard disk drives, Redundant Array of Inexpensive Disks (RAID) components, solid state drives, or the like. In some embodiments, each server device can implement a number of virtual machines that are controlled by a hypervisor configured to enable the virtual machines to share the physical resources of the server device. Each server device can also include a network interface for communicating with other devices within the network 100.

In some embodiments, the client device 110 can include a desktop computer or workstation, a laptop computer, a mobile device (e.g., a cellular phone), a terminal device, a kiosk, a hand-held device, a television, an Internet of Things (IoT) device, or the like. The client device 110 can be connected to the network 100 via a wired interface, such as Ethernet, or a wireless interface, such as a cellular radio access network (RAN) or a WiFi network.

In some embodiments, cloud service providers may develop consumer applications, such as a first consumer application 120, Consumer App A, and a second consumer application 130, Consumer App B. The applications can utilize one or more network based services within the hybrid cloud network architecture.

Although not shown explicitly in FIG. 1A, different cloud services providers can develop services that are hosted in one or more data centers. Each data center can be associated with one or more API gateways 160, and APIs for the services are deployed to the corresponding API gateways 160. The consumer applications 120, 130 can then be configured to generate API calls that are transmitted from the consumer application 120, 130 to the identified API in a corresponding API gateway 160. Since the consumer application 120, 130 may be hosted in a different data center than the corresponding API gateways 160, there is a need for the consumer applications 120, 130 to be authenticated by the API gateways 160. Furthermore, there is a need to authorize a single user of a client device 110 to access multiple APIs associated with services from multiple cloud service providers.

Figure 1B:
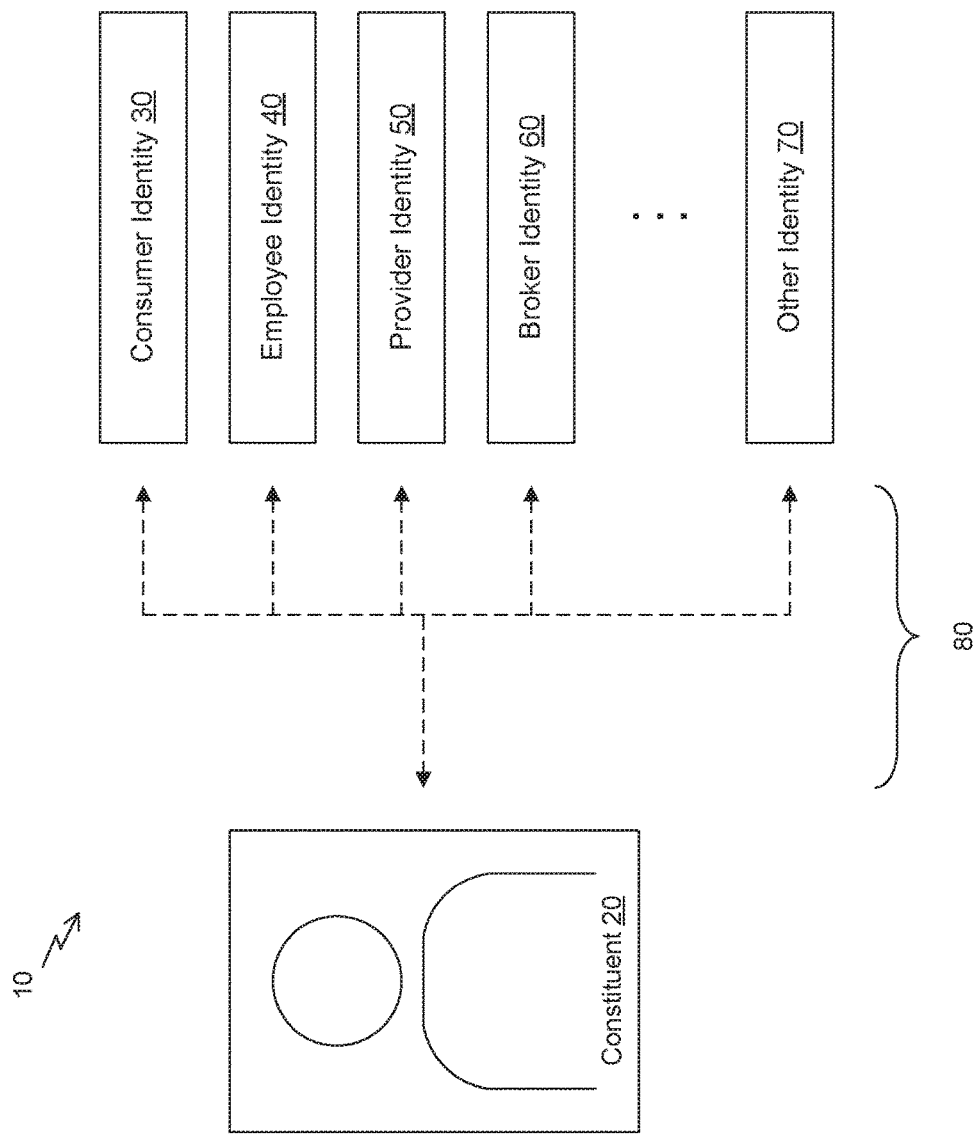
FIG. 1B illustrates a concept of a global identity context, in accordance with some embodiments.

FIG. 1B illustrates a concept of a global identity context 10, in accordance with some embodiments. A global identity context 10 for a constituent 20 associates a number of different identities with the constituent 20 based on relationships 80 between the constituent 20 and a hybrid cloud provider. In an embodiment, the hybrid cloud provider refers to an organization that manages the infrastructure or resources of at least a portion of the hybrid cloud. As an example, the hybrid cloud provider can manage the resources that provide a control plane for various services to connect to and utilize various hybrid cloud capabilities.

In an embodiment, a constituent 20 refers to a consumer constituent that has a consumer identity 30 associated with a consumer relationship with the organization. The consumer constituent can be an individual associated with demographic information or an entity associated with a group of one or more individuals. For example, a consumer constituent can refer to a purchaser of goods or services from a business of the organization. A consumer constituent can also refer to a group or business that includes multiple individuals that purchase goods or services through a business-to-business (B2B) relationship. In yet another embodiment, a consumer constituent can refer to a prospective purchaser of goods or services that is a target of marketing efforts made by the organization. For example, the consumer constituent can be a household comprising a known or unknown number of individuals within the household, an individual that requested information from the organization through marketing efforts (e.g., online solicitation, phone outreach, etc.), or a business that is targeted by a sales department of the organization.

In some embodiments, a constituent 20 may establish more than one identity with the organization based on different types of relationships 80. For example, as depicted in FIG. 1B, a constituent 20 can be associated with an employee identity 40, a provider identity 50, a broker identity 60, or any number of other identities 70 based on different types of relationships 80. As used herein, an employee identity 40 is associated with an employment relationship 80 between an employee and an employer; a provider identity 50 is associated with a provider relationship 80 between a provider of a good or service and the organization, which is related to that good or service as a third-party through an agreement with the provider; and a broker identity 60 is associated with a broker relationship 80 where an individual or entity sells goods or services provided by the organization to consumers. For example, a medical provider that provides medical services and accepts payment through a health insurance plan may have a provider relationship 80 with the health insurance organization. As another example, an insurance broker that sells health insurance plans to individuals or groups may have a broker relationship 80 with the health insurance organization. It will be appreciated that the types of identities included within a global identity context 10 are not limited to the type shown in FIG. 1B nor are they limited to the types of relationships that are created with organizations in any particular industry. Any identity that can be distinguished based on the types of interactions between individuals or entities and an organization are within the scope of a global identity context 10.

Returning now to FIG. 1A, the global identity platform can provide authentication and authorization capabilities to the consumer applications. In an embodiment, these capabilities can be provided through session tokens generated by the AM App 140. A session token refers to a packet of information (e.g., a data structure having a particular format) that represents an authorization to access a particular resource.

In an embodiment, when a user, via a client device 110, connects with a consumer application 120, the consumer application 120 can be configured to re-direct the client device 110 to communicate with the AM App 140, via the AM API 142. For example, the consumer application 120 can send an HTTP message to a browser application of the client device 110 that causes the browser application to transmit an HTTP message to the AM API 142. The HTTP message can be referred to as an API call. The AM App 140 then transmits a HTTP document to the client device 120 that prompts the user to sign in to an existing account or register a new account. If the account exists, then the user provides the credentials (e.g., username/password) for the account, which are transmitted back to the AM App 140, via the AM API 142, for verification. However, in some instances, a user may select the option to register a new account, which causes the AM App 140 to register a new account in the account directory 180.

Assuming the account exists and the credentials provided by the user and received by the AM App 140 match stored credentials for the account in the account directory 180, then the AM App 140 generates a session token that is issued to the consumer application 120. In an embodiment, the session token is generated using an Open ID Connect protocol and includes information related to the individual identifier for the user. In some embodiments, a local identifier for the user account in the account directory 180 is mapped to an individual identifier that represents a global identifier for a global identity context associated with the user account. The individual identifier can be included in the session token as a payload of the session token. In other embodiments, the payload of the session token can be based on the individual identifier, such as a hash value that is calculated by applying a hash function to the individual identifier. In this manner, the payload of the session token cannot be read to obtain the individual identifier directly, but an entity that is aware of the individual identifier can verify the authenticity of the session token by checking the payload against a hashed version of the individual identifier.

Once the consumer application 120 has received the session token, the consumer application 120 can request one or more local identifiers from the IM App 150, via the IM API 152. The IM APP 150 verifies the session token and returns one or more local identifiers corresponding to the global identity context associated with the session token. The consumer application 120 can then pass the session token and a corresponding local identifier to a corresponding service when making an API call to the service, which enables the consumer application 120 to access the service without requiring re-authentication at the service.

In some embodiments, a first consumer application 120 can be configured to provide the session token to a second consumer application 130, which can then request the local identifiers corresponding to the session token from the IM App 150, as described above. The second consumer application 130 is then permitted to access one or more services using the session token and the local identifier(s) without having to re-prompt the user for credentials associated with a user account.

In some embodiments, the session token is passed from the first consumer application 120 to the second consumer application 130 when the initiation of the second consumer application 130 is caused by the first consumer application 120. However, in cases where the second consumer application 130 is initiated manually by a user or by an unrelated process, the session token is not shared with the second consumer application 130. For example, if a mobile application connected with the first consumer application 120 is re-directed to connect to a second consume application 130, then the first consumer application 120 may also share the session token with the second consumer application 130; but if the user manually opens a new tab in the browser window and directs the browser to the second consumer application 130, then the session token is not shared and the user may be prompted for new credentials to sign in to a user account with the second consumer application 130.

Figure 2:
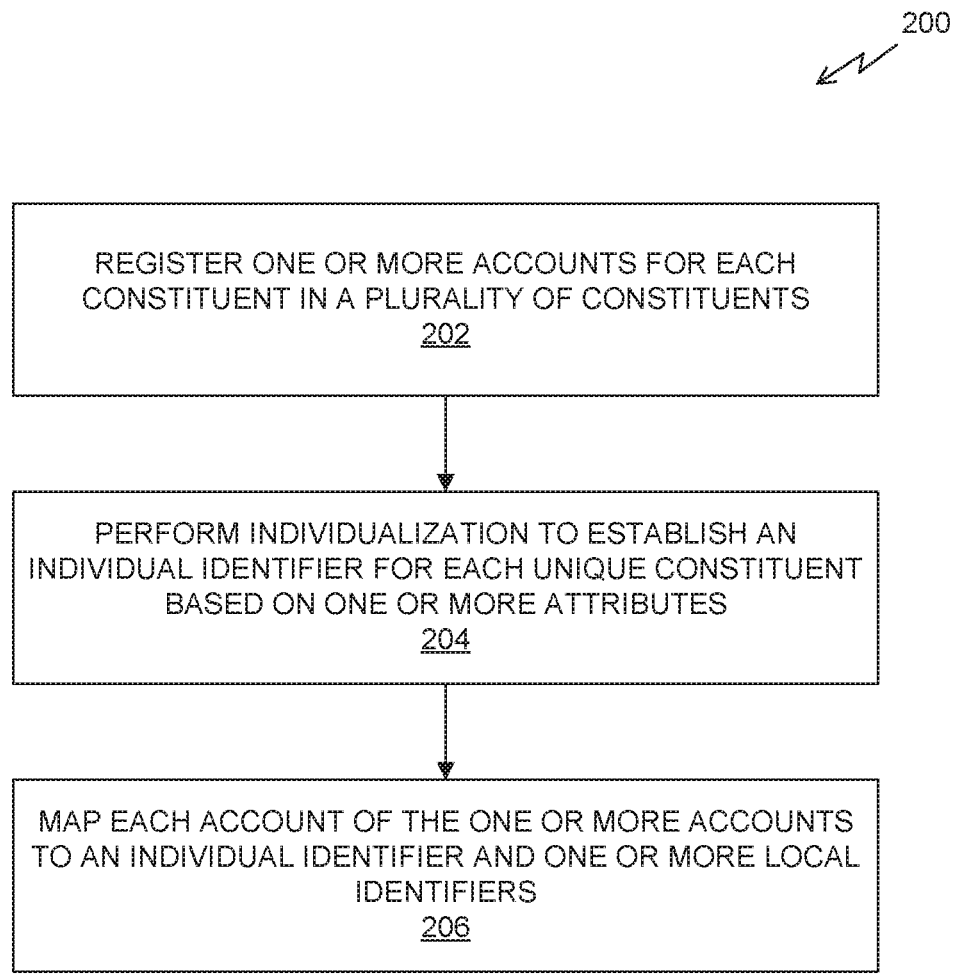
FIG. 2 is a flow diagram of a method for registering an account, in accordance with some embodiments.

FIG. 2 is a flow diagram of a method 200 for registering an account, in accordance with some embodiments. The method 200 can be performed by a program, custom circuitry, or by a combination of custom circuitry and a program. For example, the method 200 can be performed by one or more processors configured to execute instructions that cause the processor(s) to carry out the steps of the method 200. Furthermore, persons of ordinary skill in the art will understand that any system that performs method 200 is within the scope and spirit of the embodiments described herein.

At step 202, one or more accounts are registered for each constituent in a plurality of constituents. In an embodiment, each account can be created and added to the account directory 180. Each account can be allocated an identifier in the account directory. A user that registers the account may be prompted to create credentials (e.g., a username/password) to access the account at the time of registration.

In one embodiment, each account is granted a low level of assurance (LoA) at the time the account is registered. The LoA refers to a degree of certainty that the user associated with the account is a particular individual or entity. The LoA can be increased when the registration process adds additional levels of security to verify that an individual registering the account is the individual associated with the account. For example, in some instances, an account may be registered in-person with an account representative of the organization, such as by creating a financial account at a financial institution. Steps such as requiring photo identification at the time of registration may be performed by the account representative that increases the degree of certainty that the account information is correctly tied to a particular individual and, in some instances, the LoA of the account can be increased at the time of registration.

In some embodiments, a vetting procedure may be performed based on information known about an individual. The organization may have access to certain personally identifying information about a number of individuals. When a person registers an account, such as online, the AM App 140 can transmit one or more vetting questions to the user registering the account. The user, through the client device 110, can provide a vetting response that is transmitted back to the Am App 140 via the AM API 142. The vetting response can be verified by the IM App 150 and, in response to verification, the AM App 140 can increase the LoA associated with that account. It will be appreciated that account registration and vetting or adjusting the LoA associated with an account can be performed separately. For example, a user can register an account at one time and then be asked to answer vetting questions at a later time.

At step 204, an individualization procedure is performed to establish an individual identifier for each unique constituent based on one or more attributes. In an embodiment, the individualization procedure maps transaction records associated with each account to an individual identifier for a unique constituent. In some embodiments, the individual identifier can be referred to as a global identifier. The transaction record can include information collected by a service provider when the account was registered by a user or additional information known about the user collected by the service provider. For example, the transaction record can include a name, address, and date of birth provided by the user when the account was created, but can also include a MAC address or IP address of the client device used to create the account or other information provided by the user through the account (e.g., purchase information, relationships with other users, etc.).

In some embodiments, the transaction record includes demographic information that is used to match the user associated with the account to a unique constituent with matching demographic information. For example, a name, address, date of birth, identifier, or the like can be parsed from the transaction record and compared to a table of demographic information for existing constituents to find candidates that match the demographic information provided within the transaction record. If there is a match, then the individual identifier for that constituent can be associated with the user account or identifier for the user account. If there is not a match, then a new constituent with a new individual identifier can be created and mapped to the user account or the identifier for the user account. Alternatively, in some embodiments, if there are multiple matches, then a task can be created in a queue to have a person manually match the account or identifier for the user account to a particular candidate constituent.

At step 206, each account of the one or more accounts is mapped to an individual identifier and one or more local identifiers. In an embodiment, one or more accounts are mapped to an individual identifier for a unique constituent, and that individual identifier is mapped, by the IM App 150, to one or more local identifiers. As used herein, a local identifier can refer to an identifier (e.g., a UUID, a GUID, etc.) maintained by a cloud service provider as an identifier for the constituent within the context of a service provided by the cloud service provider. The cloud service provider does not have visibility to the individual identifier for the constituent within the context of the hybrid cloud. Therefore, the API calls transmitted to the service, via a corresponding API in a particular API gateway 160, may be transmitted with the local identifier for that service in order to enable the consumer application to access that service. The consumer application 120,130 can request the local identifier from the IM App 150, via the IM API 152, and then pass the local identifier to the API with the API call.

Figure 3:
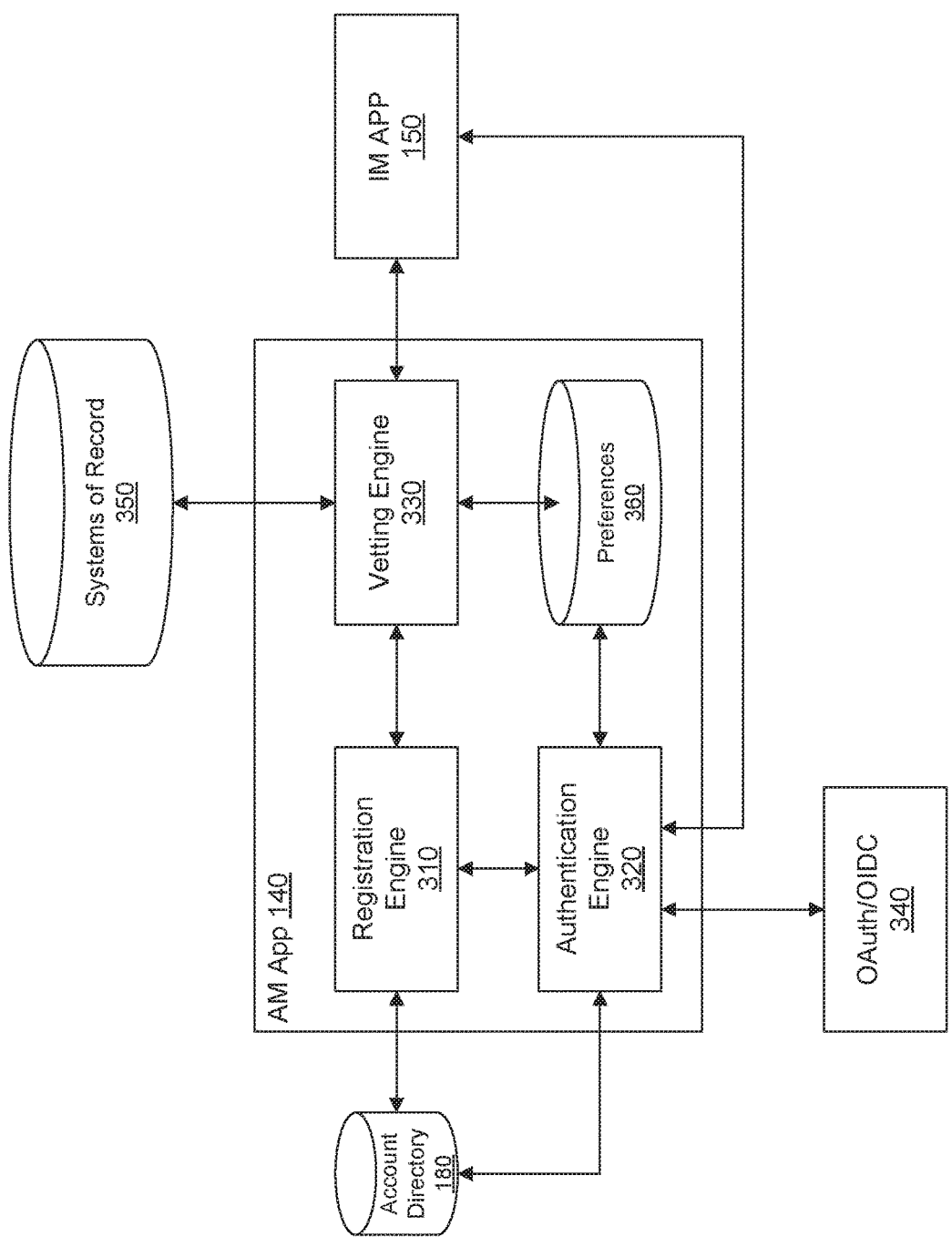
FIG. 3 illustrates a structure of the account management application, in accordance with some embodiments.

FIG. 3 illustrates a structure of the AM App 140, in accordance with some embodiments. The AM App 140 includes a registration engine 310, an authentication engine 320, and a vetting engine 330. The AM App 140 also includes a preferences database 360. In some embodiments, the preferences database 360 can be external to the AM App 140, and the components of the AM App 140 can communicate with an interface (e.g., API) of the preferences database.

In one embodiment, the registration engine 310 is configured to process registration requests for new accounts. The registration engine 310 communicates with the account directory 180 to create new entries that associate each account with an account identifier. The registration engine 310 can also associate each account with a LoA.

In an embodiment, the authentication engine 320 is configured to authenticate clients connected to one or more consumer applications 120, 130 and authorize the consumer applications 120, 130 to access various services. The authentication engine 320 is connected to the account directory 180, which can store credentials associated with the account that enables the authentication engine 320 to verify credentials provided in an authentication request with the stored credentials in the account directory 180.

In an embodiment, the authentication 320 is configured to utilize an Open Authorization (OAuth) protocol and/or an Open ID Connect (OIDC) protocol in performing authentication or authorization of client devices and/or consumer applications. The authentication engine 320 can communicate with an OAuth/OIDC module 340 that implements the OAuth/OIDC protocol(s).

In an embodiment, when a client device 110 connects with a consumer application 120, the consumer application 120 may prompt the user to sign-in to an account using the authentication engine 320. In an embodiment, the consumer application 120 redirects a web browser or a hosted application on the client device 110 to communicate with the AM App 140 (e.g., via the AM API 142). The client device 110 then sends an authentication request to the AM App 140 that includes credentials for the account associated with a user of the client device 110. The authentication engine 320 reads the credentials from the authentication engine 320 and verifies the credentials match credentials stored in the account directory 180.

Once the credentials have been verified by the authentication engine 320, a token is sent to the consumer application 120 that authorizes the consumer application 120 to access resources within the hybrid cloud. In an embodiment, the token is a JSON (JavaScript Object Notation) web token that includes information associated with the account. The token may be generated by sending a request from the authentication engine 320 to the OAuth/OIDC module 340. The consume application 120 can utilize the token to request local identifiers associated with the global identity context for the user, where each local identifier can be used to access one or more APIs hosted by an API gateway 160 in order to provide the consumer application 120 with access to various services in the hybrid cloud that are authorized for the user.

In an embodiment, the AM App 140 includes a vetting engine 330 that enables the account to be vetted. As used herein, vetting refers to performing any action that increases a degree of confidence that an account is associated with a particular individual. In an embodiment, vetting questions can be registered for a constituent in the preferences database 360. In response to initiating a vetting procedure, the vetting engine 330 is configured to determine one or more vetting questions to send to the client device 110. The client device 110 can prompt the user to provide a response to the one or more vetting questions. Examples of vetting questions can be, e.g., "Where were you born?", "What is your mother's maiden name?", or "What is the name of your pet?". The answers to these questions should be known and stored in the preferences database 360 at the time of registration of the vetting questions.

In some cases, the user registers vetting questions and their answers when the account is created. In other cases, the vetting questions and answers can be retrieved from other sources of information and do not require direct input from the user. For example, the vetting responses can be derived from information included in systems of record 350 collected by one or more business units of an organization through the normal course of business. For example, a user may have an account that is billed monthly through invoices. A vetting question can be registered that asks the user to provide the invoice amount for a most recent bill. The systems of record can include the invoice amount such that the vetting engine 330 can verify the vetting response provided by the user. In another embodiment, the vetting responses received from the client device 110 are forwarded to the IM App 150, which verifies the vetting responses for the user. For example, the vetting response may be related to a global identity context associated with the account. The vetting engine 330 can send the vetting response to the IM App 150 for verification of the vetting response. The IM App 150 verifies the vetting response and sends a confirmation message to the vetting engine 330. In some cases, the vetting response cannot be verified and the IM App 150 can send an indication that the vetting response was not verified in the confirmation message.

Figure 4:
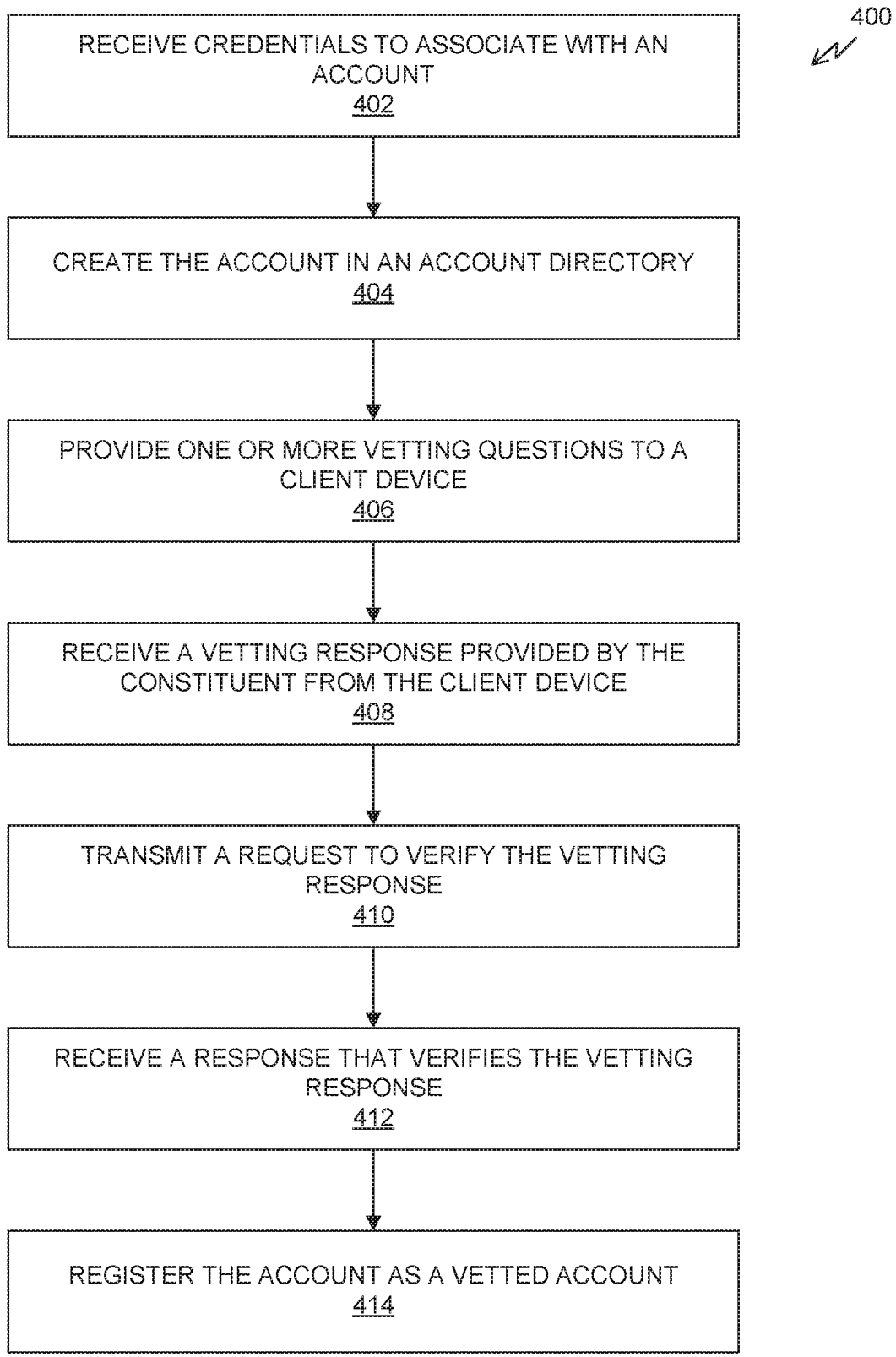
FIG. 4 is a flow diagram of a method for registering a new account, in accordance with some embodiments.

FIG. 4 is a flow diagram of a method 400 for registering a new account, in accordance with some embodiments. The method 400 can be performed by a program, custom circuitry, or by a combination of custom circuitry and a program. For example, the method 400 can be performed by one or more processors configured to execute instructions that cause the processor(s) to carry out the functionality of the AM App 140. Furthermore, persons of ordinary skill in the art will understand that any system that performs method 400 is within the scope and spirit of the embodiments described herein.

At step 402, credentials are received to associate with an account. In an embodiment, the credentials can be provided by a user when attempting to register an account. The credentials can include a username and a password to associate with the account.

At step 404, the account is created in an account directory 180. In an embodiment, an entry in the account directory 180 can be created for the account. The entry can associate the credentials with an account identifier. In some embodiments, the account identifier is also mapped to a LoA for the account. The LoA can be a minimum LoA at the time of the account creation.

At step 406, one or more vetting questions are provided to a client device 110. In an embodiment, a vetting engine 330 identifies one or more vetting questions registered for the account. The vetting questions are associated with stored responses.

At step 408, a vetting response is received from the client device 110. The vetting response can include responses from the constituent to the one or more vetting questions.

At step 410, a request to verify the vetting response is transmitted to the IM App 150. In an embodiment, the request is transmitted to the IM App 150 via an API call to the IM API 152. The request can include an account identifier for the account and the vetting response. In some embodiments, the IM App 150 is configured to map the account identifier to an individual identifier. The IM App 150 then verifies the vetting response received in the request based on information corresponding to the individual identifier.

At step 412, a response is received from the IM App 150 that verifies the vetting response. In an embodiment, the response is a confirmation message and includes the account identifier.

At step 414, the account is registered as a vetted account. In an embodiment, a vetted account is accorded a higher LoA within the account directory 180. The LoA can enable a consumer application 120 where a user has signed-in to the account access to a broader range of services.

Figure 5A:
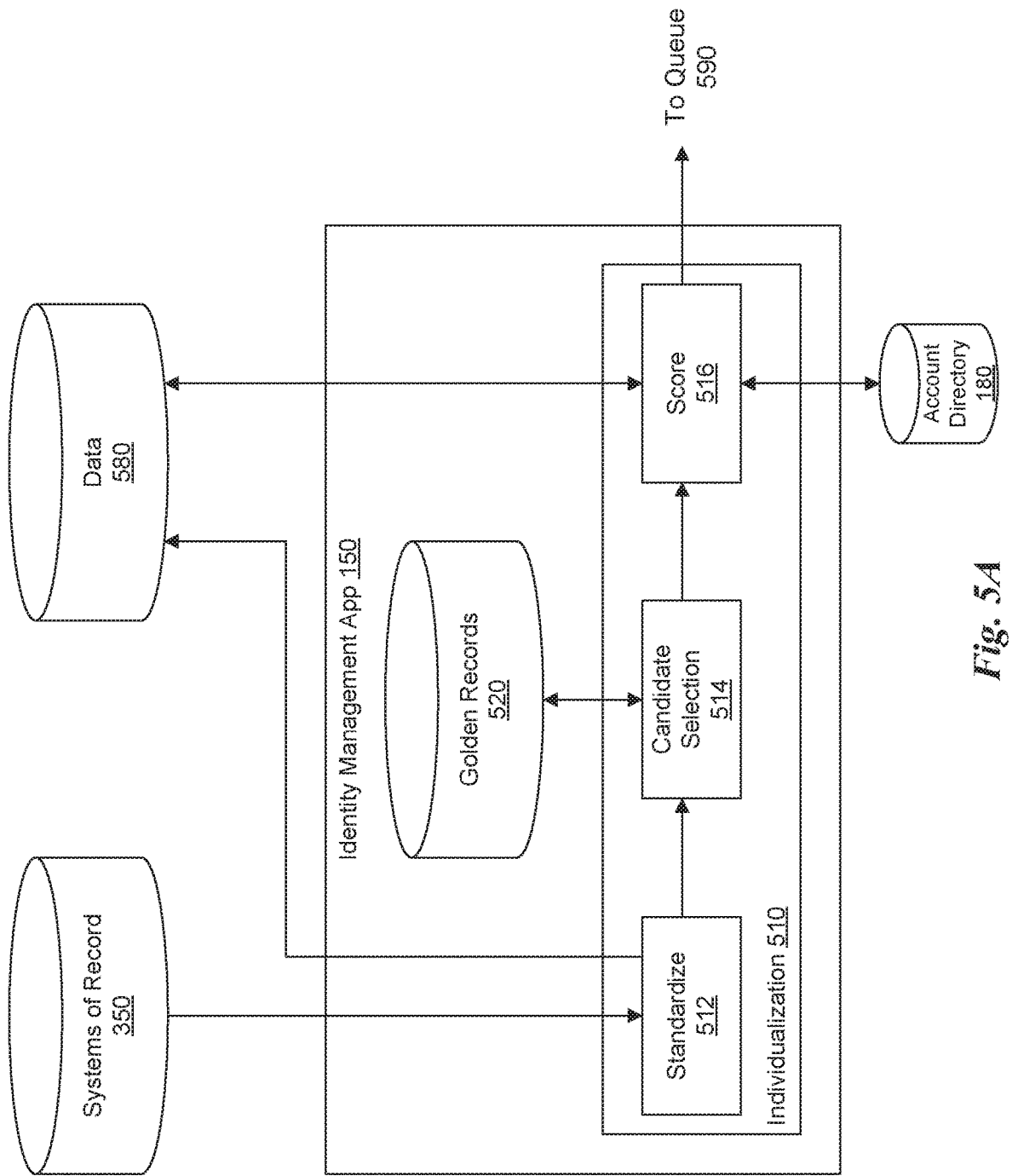
FIG. 5A illustrates a portion of the structure of the identity management application, in accordance with some embodiments.

FIG. 5A illustrates a portion of the structure of the IM App 150, in accordance with some embodiments. The IM App 150 includes an individualization module 510. The individualization module 510 is configured to identify unique constituents based on transaction records in systems of records database 350.

In an embodiment, each business unit associated with an organization can include systems that create transaction records. A transaction record can include various information related to the transaction, including an account identifier and demographic information. For example, a transaction record can store information related to a customer, prospective customer, provider, employee, or any other individual or entity that interacts with a particular business unit of the organization in the context of a particular relationship. The demographic information for a constituent can include, but is not limited to, a name (e.g., first name, middle name, last name), a date of birth or an age, a gender, a relationship with other constituents (e.g., spouse, dependents, parents, etc.), an address (e.g., residential, mailing, business, etc.), a suffix (e.g., Jr., III, etc.) a prefix (e.g., Mr., Mrs., Ms., Dr. etc.), and/or an identifier (e.g., Social Security Number (SSN), employee ID, etc.).

A standardization module 512 receives a transaction record from the systems of record 350. The standardization module 512 creates a standard record based on a subset of information in the transaction record. For example, the standardization module 512 can attempt to locate a specific subset of demographic information included in the transaction record, such as a name, address, date of birth, and an identifier. The format of the demographic information can also be normalized. For example, names can be stored in a given transaction record in a single field or in multiple fields. The names may include middle names, when only first and last names are used in the standard record. All fields can be reduced to a character set that only includes lower case characters of alphanumeric values. The standard record can also indicate, with flags, if any required demographic information is missing in the transaction record. For example, an address might be incomplete (not include a street number, but does include a street name and city/state/zip code) or a date of birth is missing (e.g., only an age is provided).

In an embodiment, the standard record is then used to query database 580, which maps various demographic information to individual identifiers. For example, the standardization module 512 can create a query to gather all individual identifiers matching the first and last name included in the standard record. In other embodiments, the standardization module 512 includes logic that attempts to match as much of the demographic information in the standard record to a list of candidates gathered from one or more queries to the database 580. For example, each item of demographic information can be used to query a list of individual identifiers that match that particular item of demographic information. The list of candidates can then be formed by determining which individual identifiers are included in the greatest number of returned lists from each of the individual queries.

The list of candidates is then forwarded to the candidate selection module 514. Each individual identifier returned in the list of candidates is used to access a corresponding golden record for that candidate. The golden records 520 represent the set of demographic information known to be associated with a global identity context. Each unique individual identifier is associated with a corresponding golden record in a one-to-one ratio. The golden record contains the best source of demographic information for a given constituent mapped to a particular individual identifier.

In some embodiments, the candidate selection module 514 is configured to compare the standard record to the golden record for each individual identifier included in the list of candidates. A heuristic algorithm can be employed to determine whether the standard record is a match for the golden record. The heuristic algorithm produces a score that is associated with the candidate individual identifier.

In some embodiments, if the list of candidates is empty, then the candidate selection module 514 is configured to create a new global identity context for the constituent associated with the standard record. A new individual identifier is issued and a golden record is created with the demographic information in the standard record and associated with the individual identifier in the golden records database 520. It will be appreciated that, when a transaction record does not match with any candidates in the database 580, then the transaction record may be associated with a new constituent and, therefore, a new individual identifier for a global identity context is created for the new constituent.

However, if the list of candidates is not empty, then the candidate selection module 514 generates a score for each of the candidates in the list and passes the scores and list of candidates to the score evaluation module 516.

In an embodiment, the score evaluation module 516 is configured to determine if the list of candidates includes one and only one individual identifier. If there is only one match, and the heuristic score is above a threshold value, then that individual identifier is matched to the transaction record and the account identifier corresponding to the transaction record is mapped to the individual identifier for the single candidate. In some embodiments, the heuristic score is ignored if only one candidate is returned in the list of candidates. In other embodiments, a single candidate with a score below the heuristic score will be added to a queue 590, where a manual evaluation can be performed to determine whether the transaction record is likely a match for the individual identifier.

However, if the list of candidates includes multiple candidates then, in an embodiment, candidates may be discarded if a corresponding heuristic score for each candidate is below a threshold value. If the list of candidates with scores above a threshold value is more than one, then the list of candidates can be added to the queue 590 to be manually evaluated. However, if only one candidate has a score above the threshold value, then the individual identifier for that candidate is associated with the account identifier corresponding to the standard record.

It will be appreciated that the individualization procedure described above is merely one example of an automatic process for creating a global identity context for unique constituents based on transaction records created by a variety of different service providers by matching the transaction records based on demographic information. The individualization procedure not only creates new individual identifiers when needed, but maps new account identifiers within the context of different service providers to an existing global identity context having a single individual identifier within the entire scope of the hybrid cloud.

Figure 5B:
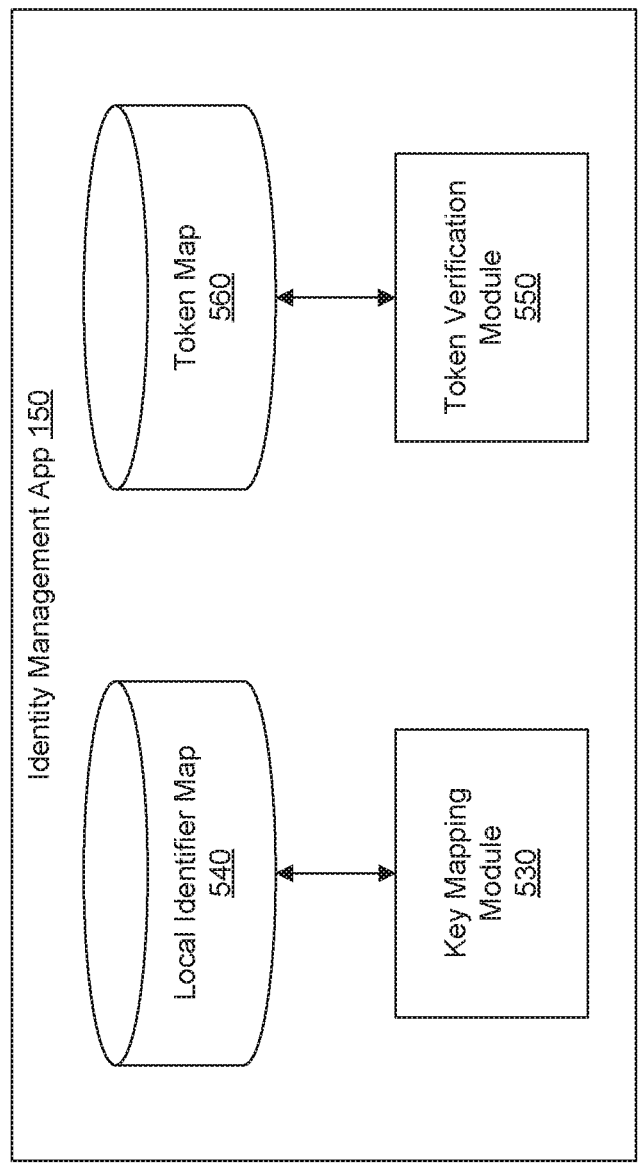
FIG. 5B illustrates a different portion of the structure of the identity management application, in accordance with some embodiments.

FIG. 5B illustrates a different portion of the structure of the IM App 150, in accordance with some embodiments. The IM App 150 can also include a key mapping module 530 and a token verification module 550. The key mapping module 530 is configured to map an individual identifier for a unique constituent to one or more local identifiers utilized by various service providers that have services in the hybrid cloud. The individual identifier cannot be used to access the services, but the local identifier corresponding to a particular service is used to access the particular service. A local identifier map 540 associates each individual identifier with zero or more local identifiers. Each of the local identifiers can be provided to the IM App 150 by a corresponding service provider and mapped to an account established by that service provider. During individualization, that account is tied to an individual identifier for a unique constituent, and the local identifier for the account can be associated with the individual identifier within the local identifier map 540.

The token verification module 550 includes logic for analyzing a session token to verify that the session token is active for a particular constituent. In an embodiment, the IM App 150 maintains a token map 560 that maps session tokens to individual identifiers associated with the session tokens. In some embodiments, each individual identifier is mapped to a maximum of one session token. Previous session tokens issued to the constituent can be referred to as inactive, and only the most recently issued session token to a particular constituent is considered active. In some embodiments, each session token is associated with expiration information that specifies a time that the issued session token will expire and no longer be considered active.

In an embodiment, when the IM App 150 receives a session token, the token verification module 550 parses information included in the session token to identify a particular individual identifier corresponding to the session token. The information may represent a key used in a query of the token map 560 that returns an individual identifier associated with the session token. In some embodiments, the individual identifier can then be used in a second query to look up an active session token for the individual identifier. The active session token can be compared against the session token to determine whether the session token is still active and permits the consumer application to recover one or more local identifiers corresponding to the individual identifier.

In some embodiments, once the session token has been verified, the key-mapping module 530 is used to query the local identifier map 540 to return one or more local identifiers corresponding to the individual identifier for the constituent. The one or more local identifiers are then transmitted to the consumer application 120 and can be used to connect to services in the hybrid cloud.

Figure 6A:
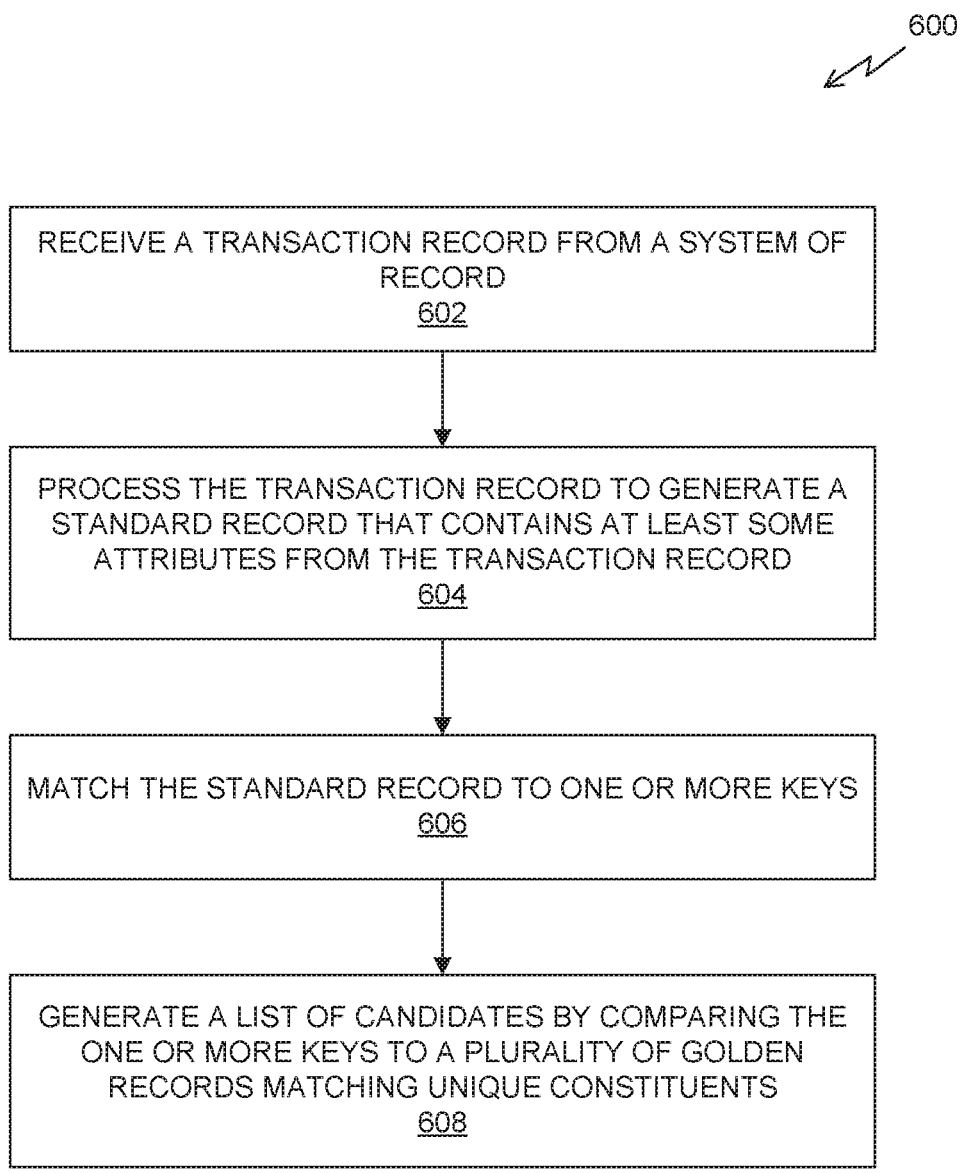
FIG. 6A is a flow diagram of a method for performing individualization, in accordance with some embodiments.

FIG. 6A is a flow diagram of a method 600 for performing individualization, in accordance with some embodiments. The method 600 can be performed by a program, custom circuitry, or by a combination of custom circuitry and a program. For example, the method 600 can be performed by one or more processors configured to execute instructions that cause the processor(s) to carry out the functionality of the IM App 150. Furthermore, persons of ordinary skill in the art will understand that any system that performs method 600 is within the scope and spirit of the embodiments described herein.

At step 602, a transaction record is received from a system of record. In an embodiment, a transaction record is any data structure or file that contains information related to a transaction. The transaction record can include demographic information related to an individual. In some embodiments, the transaction record is a record created and maintained by a service provider in accordance with one or more record policies. The transaction record can reflect a form that includes a number of fields where information related to the transaction are entered, and the fields can include fields for collecting demographic information. For example, the transaction record can be an intake form for a medical provider that is input into a system, electronically, and stored in the system of record 350.

At step 604, the transaction record is processed to generate a standard record that contains at least some attributes from the transaction record. In an embodiment, the IM App 150 implements logic that is configured to parse the transaction record to identify a number of specific attributes related to an individual contained in the transaction record. For example, the attributes may include a name, address, date of birth, and the identity of any dependents for the individual.

At step 606, the standard record is matched to one or more keys. In an embodiment, the attributes in the standard record are used to query a data store (e.g., a relational database, key-value data store, etc.) to identify one or more keys. In some embodiments, the keys are individual identifiers corresponding to constituents included in a golden records database. The golden record for a constituent contains the known attributes for the constituent.

At step 608, a list of candidates is generated by comparing the one or more keys to a plurality of golden records matching unique constituents. It will be appreciated that the keys returned in step 606 may represent a broad net that includes constituents that match as few as one attribute included in the standard record. However, the candidate list may be limited to constituents that match a minimum number of attributes. For example, keys can be returned for every individual identifier that matches a first name or a last name of a constituent, as well as any number of additional attributes, but the candidate list may only include those individual identifiers that match at least the full first and last name plus one or more additional attributes such as date of birth, address, or a portion of an address (e.g., city and state).

Figure 6B:
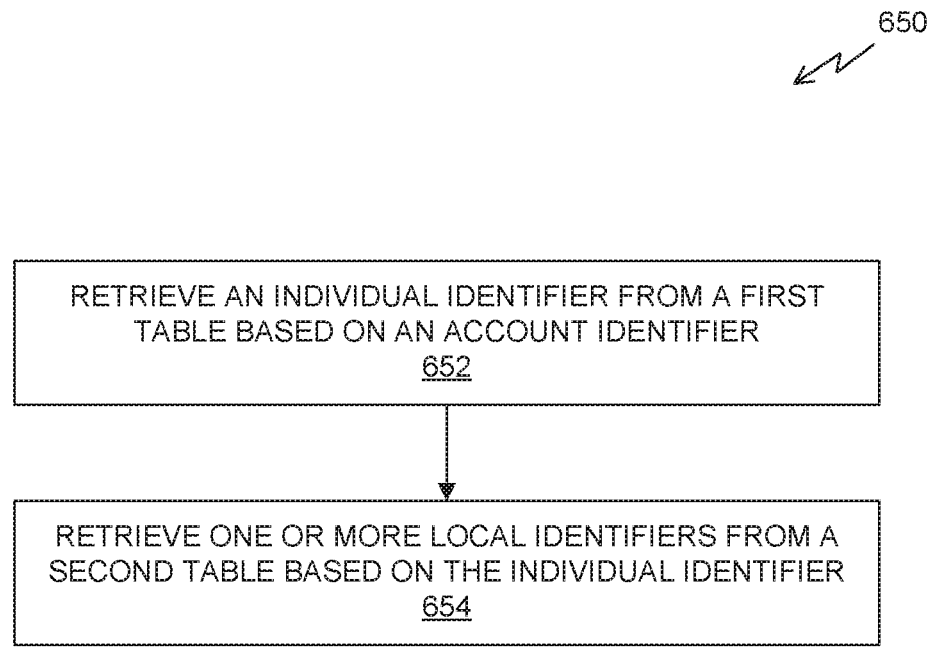
FIG. 6B is a flow diagram of a method for mapping account identifiers to local identifiers, in accordance with some embodiments

FIG. 6B is a flow diagram of a method 650 for mapping account identifiers to local identifiers, in accordance with some embodiments. The method 650 can be performed by a program, custom circuitry, or by a combination of custom circuitry and a program. For example, the method 650 can be performed by one or more processors configured to execute instructions that cause the processor(s) to carry out the functionality of the IM App 150. Furthermore, persons of ordinary skill in the art will understand that any system that performs method 650 is within the scope and spirit of the embodiments described herein.

At step 652, an individual identifier is retrieved from a first table based on an account identifier. The first table can be populated based on the individualization procedure. In an embodiment, the AM App 140 can transmit a request to the IM App 150 that requests an individual identifier based on an account identifier provided in the request. The IM App 150 uses the account identifier to query the first table. If the return set is empty, then the account identifier is not mapped to any individual identifiers and the individualization procedure may need to be run for a transaction record related to the account. If the return set includes one individual identifier, then the IM App 150 can transmit that individual identifier to the AM App 140, which may utilize the individual identifier to generate a session token for the account. In some embodiments, the IM App 150 is configured to generate the session token based on the individual identifier and transmit the session token to the AM App 140 without sending the individual identifier to the AM App 140 directly.

At step 654, one or more local identifiers are retrieved from a second table based on the individual identifier. After linking the account identifier to the individual identifier, the individual identifier can be used to query a second table to retrieve a list of local identifiers corresponding to that individual identifier. It will be appreciated that the individual identifier is not tracked by the various service providers and is not correlated with their account information. The service providers use local identifiers that are correlated with particular accounts within the context of one or more services. Therefore, the individual identifier is used to access the local identifier for a service, which is then transmitted, along with a session token, together with an API call to allow a consumer application 120 to access the service through the account.

Figure 7:
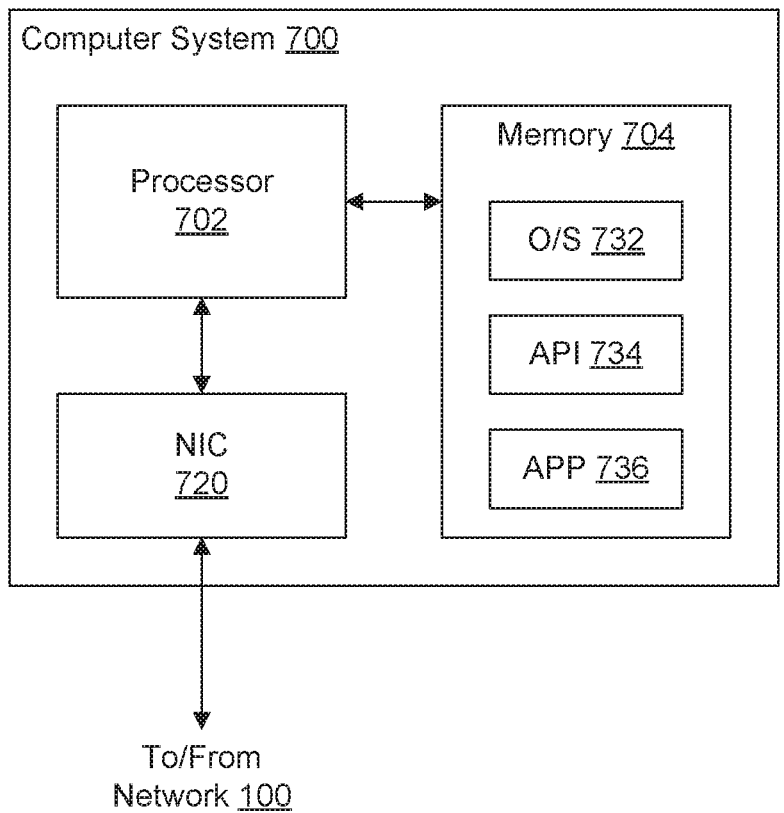
FIG. 7 illustrates an exemplary computer system, in accordance with some embodiments.

FIG. 7 illustrates an exemplary computer system 700, in accordance with some embodiments. The computer system 700 includes a processor 702, a non-volatile memory 704, and a network interface controller (NIC) 720. The processor 702 can execute instructions that cause the computer system 700 to implement the functionality of various elements of the system described above.

Each of the components 702, 704, and 720 can be interconnected, for example, using a system bus to enable communications between the components. The processor 702 is capable of processing instructions for execution within the system 700. The processor 702 can be a single-threaded processor, a multi-threaded processor, a vector processor or parallel processor that implements a single-instruction, multiple data (SIMD) architecture, or the like. The processor 702 is capable of processing instructions stored in the volatile memory 704. In some embodiments, the volatile memory 704 is a dynamic random access memory (DRAM). The instructions can be loaded into the volatile memory 704 from a non-volatile storage, such as a Hard Disk Drive (HDD) or a solid state drive (not explicitly shown), or received via the network. In an embodiment, the volatile memory 704 can include instructions for an operating system 732 as well as one or more applications. It will be appreciated that the application(s) can be configured to provide the functionality of one or more components of the system, as described above. The NIC 720 enables the computer system 700 to communicate with other devices over a network, including a local area network (LAN) or a wide area network (WAN) such as the Internet.

It will be appreciated that the computer system 700 is merely one exemplary computer architecture and that the processing devices implemented in the system can include various modifications such as additional components in lieu of or in addition to the components shown in FIG. 7. For example, in some embodiments, the computer system 700 can be implemented as a system-on-chip (SoC) that includes a primary integrated circuit die containing one or more CPU cores, one or more GPU cores, a memory management unit, analog domain logic and the like coupled to a volatile memory such as one or more SDRAM integrated circuit dies stacked on top of the primary integrated circuit dies and connected via wire bonds, micro ball arrays, and the like in a single package (e.g., chip). In another embodiment, the computer system 700 can be implemented as a server device, which can, in some embodiments, execute a hypervisor and one or more virtual machines that share the hardware resources of the server device.

For situations in which the systems discussed here collect personal information about users, or may make use of personal information, the users may be provided with an opportunity to control whether programs or features collect personal information (e.g., a user's health or medical information, information about a user's social network, social actions or activities, profession, a user's preferences, or a user's location), or to control whether and/or how to retrieve content (i.e., medical records) from a content server (i.e., a medical record database). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A system for creating global identity contexts across different information technology (IT) systems, the system comprising:
    a first server device configured to implement an account management application, wherein the account management application, responsive to execution by the first server device, is configured to:
        register, for each constituent in a plurality of constituents, one or more accounts for the constituent, wherein each account of the one or more accounts is associated with one or more local identifiers that identifies the constituent within a context of a particular service; and
    a second server device configured to implement an identity management application, wherein the identity management application, responsive to execution by the second server device, is configured to:
        perform individualization to establish an individual identifier for each unique constituent based on one or more attributes, and
        map each account of the one or more accounts to a particular individual identifier and the one or more local identifiers,
    wherein the first server device and the second server device are communicatively coupled to an application programming interface (API) gateway via a network,
    wherein performing individualization comprises:
        receiving a transaction record from a system of record;
        processing the transaction record to generate a standard record that contains at least some attributes from the transaction record;
        matching the standard record to one or more keys;
        generating a list of candidates by comparing the one or more keys to a plurality of golden records matching unique individuals; and
        responsive to the list of candidates being empty, creating a new golden record based on the standard record and associating a new individual identifier with the new golden record, or
        responsive to the list of candidates including at least one individual identifier, generating scores for each candidate in the list of candidates.

2. The system of claim 1, wherein the plurality of constituents includes at least one consumer constituent that comprises one of:
    an individual associated with demographic information; or
    an entity associated with a group of one or more individuals.

3. The system of claim 2, wherein the demographic information comprises one or more of:
    a name of the consumer constituent;
    a date of birth of the consumer constituent;
    a gender of the consumer constituent;
    an identifier for the consumer constituent;
    an address of the consumer constituent; or
    a relationship of the consumer constituent with a consumer application.

4. The system of claim 1, wherein registering an account for a constituent comprises:
    receiving credentials to associate with the account;
    creating the account in an account directory;
    providing one or more vetting questions to a client device;
    receiving a vetting response provided by the constituent from the client device;

transmitting a request to an identity management application programming interface (API) deployed on the API gateway to verify the vetting response;
receiving a response from the identity management API deployed on the API gateway that verifies the vetting response; and
registering the account in an account directory as a vetted account.

5. The system of claim 4, responsive to authentication of the client device based on the credentials:
wherein the account management application is further configured to:
transmit a user session token associated with a corresponding account to a first consumer application; and
wherein the identity management application is further configured to:
receive, via the API gateway, a request for the_one or more local identifiers associated with the account corresponding to the user session token,
authenticate information included in the session token, and
transmit the one or more local identifiers to the first consumer application.

6. The system of claim 5, wherein the first consumer application forwards the user session token to a second consumer application in response to a connection established between the client device and the second consumer application during the duration of a user session associated with the user session token.

7. The system of claim 1, wherein the at least some attributes include demographic information, and wherein performing individualization further comprises:
matching the standard record to the one or more keys by comparing the demographic information in the standard record to demographic information associated with the one or more keys.

8. The system of claim 1, wherein performing individualization further comprises:
generating a score for each candidate in the list of candidates based on a heuristic algorithm; and
removing candidates having scores below a threshold value from the list of candidates.

9. The system of claim 1, wherein mapping each account of the one or more accounts to the particular individual identifier and the one or more local identifiers comprises:
retrieving, from a first table, the particular individual identifier based on an account identifier for the account; and
retrieving, from a second table, the one or more local identifiers based on the particular individual identifier.

10. The system of claim 1, wherein each constituent is associated with one or more identities based on a relationship, and wherein the one or more identities can include:
a consumer identity;
an employee identity;
a provider identity; or
a broker identity.

11. The system of claim 10, wherein each identity of a constituent is associated with one or more accounts based on a vetting process, and wherein the one or more identities associated with the constituent comprise a global identity context for the constituent.

12. A method for creating global identity contexts across different information technology (IT) systems, the method comprising:

registering, by a first server device, for each constituent in a plurality of constituents, one or more accounts for the constituent, wherein each account of the one or more accounts is associated with one or more local identifiers that identifies the constituent within a context of a particular service;
performing, by a second server device, individualization to establish an individual identifier for each unique constituent based on one or more attributes; and
mapping, by the second server device, each account of the one or more accounts to a particular individual identifier and the one or more local identifiers,
wherein the first server device and the second server device are communicatively coupled to an application programming interface (API) gateway via a network,
wherein performing individualization comprises:
receiving a transaction record from a system of record;
processing the transaction record to generate a standard record that contains at least some attributes from the transaction record;
matching the standard record to one or more keys;
generating a list of candidates by comparing the one or more keys to a plurality of golden records matching unique individuals; and
responsive to the list of candidates being empty, creating a new golden record based on the standard record and associating a new individual identifier with the new golden record, or
responsive to the list of candidates including at least one individual identifier, generating scores for each candidate in the list of candidates.

13. The method of claim 12, wherein registering an account for a constituent comprises:
receiving credentials to associate with the account;
creating the account in an account directory;
providing one or more vetting questions to a client device;
receiving a vetting response provided by the constituent from the client device;
transmitting a request to an identity management API deployed on the API gateway to verify the vetting response;
receiving a response from the identity management API deployed on the API gateway that verifies the vetting response; and
registering the account in an account directory as a vetted account.

14. The method of claim 12, wherein the at least some attributes include demographic information, and wherein performing individualization further comprises:
matching the standard record to the one or more keys by comparing the demographic information in the standard record to demographic information associated with the one or more keys.

15. The method of claim 12, wherein mapping each account of the one or more accounts to the particular individual identifier and the one or more local identifiers comprises:
retrieving, from a first table, the particular individual identifier based on an account identifier for the account; and
retrieving, from a second table, the one or more local identifiers based on the particular individual identifier.

16. A non-transitory computer-readable medium storing instructions that, when executed by a processor, cause the processor to create global identity contexts across different information technology (IT) systems by performing steps comprising:

registering, for each constituent in a plurality of constituents, one or more accounts for the constituent, wherein each account of the one or more accounts is associated with one or more local identifiers that identifies the constituent within a context of a particular service;

performing individualization to establish an individual identifier for each unique constituent based on one or more attributes; and mapping each account of the one or more accounts to a particular individual identifier and the one or more local identifiers, wherein performing individualization comprises:

receiving a transaction record from a system of record;

processing the transaction record to generate a standard record that contains at least some attributes from the transaction record;

matching the standard record to one or more keys;

generating a list of candidates by comparing the one or more keys to a plurality of golden records matching unique individuals; and responsive to the list of candidates being empty, creating a new golden record based on the standard record and associating a new individual identifier with the new golden record, or responsive to the list of candidates including at least one individual identifier, generating scores for each candidate in the list of candidates.

17. The non-transitory computer-readable medium of claim 16, wherein registering an account for a constituent comprises:

receiving credentials to associate with the account;

creating the account in an account directory;

providing one or more vetting questions to a client device;

receiving a vetting response provided by the constituent from the client device;

transmitting a request to an identity management application programming interface (API) deployed on an API gateway to verify the vetting response;

receiving a response from the identity management API deployed on the API gateway that verifies the vetting response; and registering the account in an account directory as a vetted account.

* * * * *